M. L. WILLIAMS.
REAR AXLE TRANSMISSION MECHANISM FOR AUTOMOBILES.
APPLICATION FILED DEC. 18, 1906.
913,084. Patented Feb. 23, 1909.
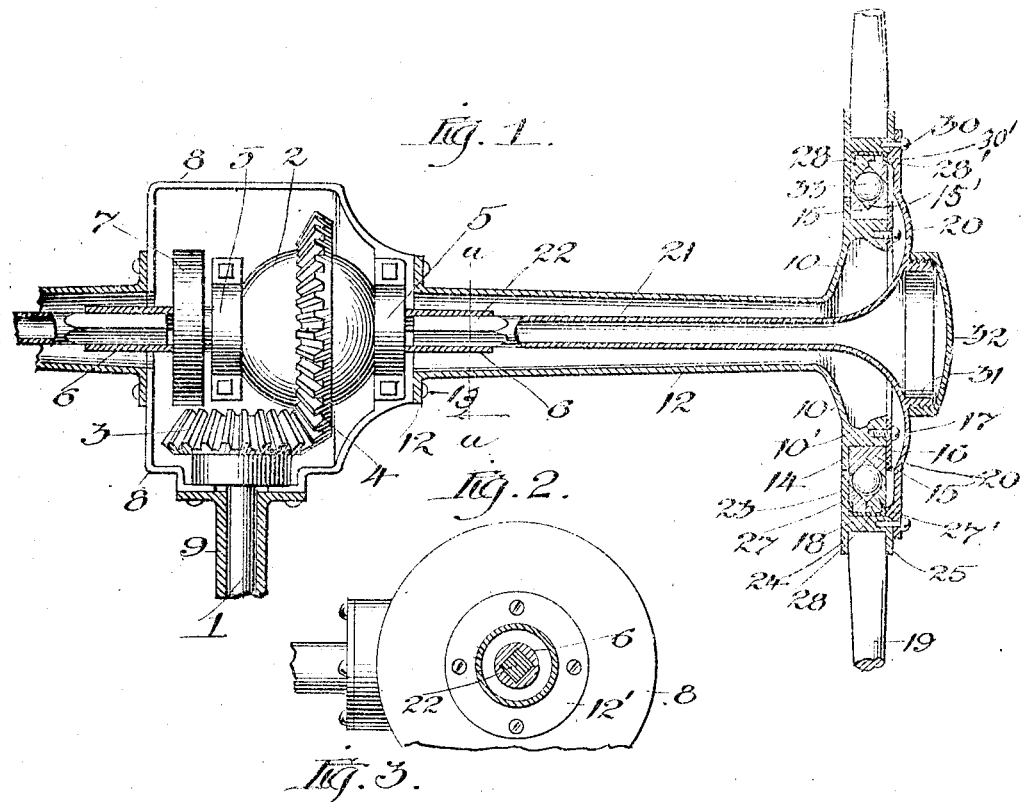
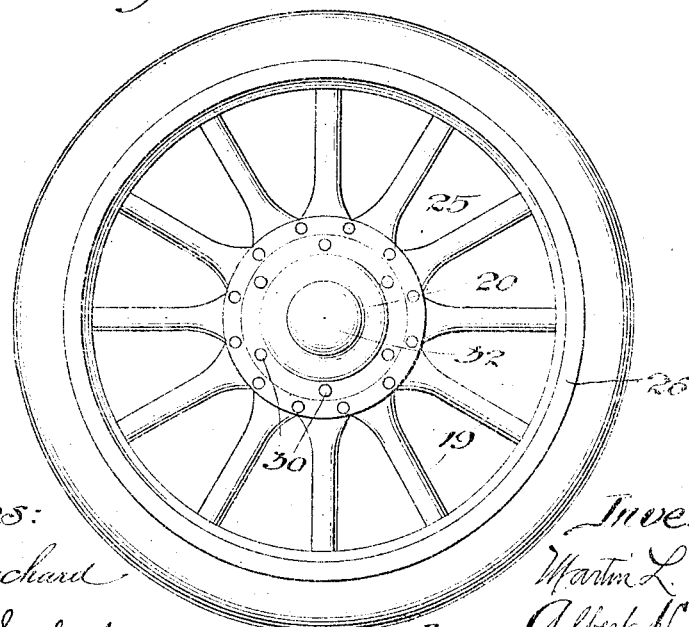
Witnesses:
Frank J. Blanchard
K. W. Imboden
Inventor:
Martin L. Williams
By Albert N. Graves,
Attorney.

UNITED STATES PATENT OFFICE.

MARTIN L. WILLIAMS, OF SOUTH BEND, INDIANA.

REAR-AXLE TRANSMISSION MECHANISM FOR AUTOMOBILES.

No. 913,084.  Specification of Letters Patent.  Patented Feb. 23, 1909.

Application filed December 18, 1906. Serial No. 348,387.

*To all whom it may concern:*

Be it known that I, MARTIN L. WILLIAMS, a citizen of the United States, residing at South Bend, in the county of St. Joseph and State of Indiana, have invented certain new and useful Improvements in Rear-Axle Transmission Mechanism for Automobiles, of which the following is a specification.

My invention relates to rear axle transmission mechanism for automobiles, and refers more specifically to a novel vehicle wheel provided with a rigid axial extension arranged to coöperate with a vehicle frame and driving connections adapted thereto.

Among the salient objects of the invention are to provide a construction in which the vehicle wheel is in effect provided with an unusually long or axially extended bearing support but is nevertheless journaled practically upon a single bearing, whereby I secure the advantages incident to a single relatively narrow set of anti-friction bearings or equivalent together with the advantages of a relatively long journal support; to provide a construction in which the chief journal support is located substantially in the plane of the wheel and the coöperating support or mounting of the wheel is located inside of the plane of the wheel, thus avoiding the necessity of the usual external hub projection; to provide a construction in which the driving moment is transmitted directly from the equalizer mechanism to a rigid member of the wheel, thus avoiding the objection of intermediate clutch mechanism; to provide a construction in which the external face of the wheel, in so far as its central portion which incloses the journal bearings is concerned, is solid and therefore dust and weather-proof; to provide a construction in which a single set of anti-friction bearings forms the chief journal support for the wheel and the race of such roller bearings is of relatively large diameter, thus combining ease of movement with great strength and durability; and in general to provide an improved construction of the character referred to.

In the accompanying drawings, Figure 1 is a substantially horizontal sectional view of a rear axle transmission mechanism embodying my invention, and adapted for the now usual shaft drive from the engine; Fig. 2 is a cross-section taken on line *a—a* of Fig. 1; Fig. 3 is an outside face view, on a reduced scale, of the wheel shown in Fig. 1.

1 designates the shaft which transmits the motive power from the engine (not shown) to the differential gear which is housed within the spherical casing 2; power being transmitted to the differential through the intermeshing bevel gears 3 and 4.

5 and 5 are the journal bearings of the driving-wheel-shaft-members 6 and 6, and 7 indicates the usual brake-drum, the brake-band being for clearness omitted.

The differential gear employed is of a simple and well known type comprising a pair of bevel gears drivingly connected by two or more planetary pinions.

The parts just named are inclosed by a suitable housing 8, which rigidly supports the bearings 5 and is secured at its forward end to a sleeve 9 surrounding the main drive-shaft 1. This housing is, and may properly be termed as, a portion of the vehicle frame.

The rear wheel (one of which is shown with its outer portion broken away) is constructed in two concentric main parts, which may be termed the hub portion and the wheel proper, respectively. One of the peculiarities of the construction to be described is that the wheel bearing is not within the hub, as has been usual hitherto, but is exterior thereto and preferably at a considerable distance from the axis of the wheel. The hub portion is non-rotative.

The hub portion, designated as a whole 10, is rigidly secured to the outer gear-housing 8 by means of an inwardly extending hollow axle 12, provided upon its inner end with a circular flange 12' which is secured to a reinforced portion of said housing 8, with tap-bolts 13. Preferably, said hollow axle 12 is made integral with the hub portion 10, as shown. Said hub portion comprises the outwardly extending dished portion 10, and a heavy peripheral portion 10' provided with a lateral outwardly extending flange, 14. This flange, together with the periphery of the hub member 10, provides a seat for a detachable roller bearing member, or ball-race, 15, which is formed with an angular ball-receiving groove 15'. This race is held in position by means of a flat retaining-ring 16, which is secured to the outer face of the hub portion 10' with screws 17; said ring having the same outer diameter as that of the opposed flange 14.

The wheel proper, comprises, essentially, a grooved spoke-holding ring 18, the spokes or web 19, and an inwardly tapering or bell-mouthed outer face member, 20. This member 20 is made continuous or integral with a hollow shaft 21, through the medium of which the driving power is transmitted to the rim of the wheel. It being necessary to make this shaft detachable from its rotor member 6, I provide these parts with a slip joint which comprises a non-circular socket formed in the part 6 and a correspondingly shaped shank on the end of the shaft 21, adapted to fit the socket accurately but not tightly, as shown at 22. Said shank is made solid, for strength, as shown in section in Fig. 2 of the drawing.

Returning to the wheel: it will be observed that the spoke-holding ring comprises the ring proper, 18, and three flanges, 23 24 25; the two latter extending outwardly and providing an annular spoke-groove that holds the inner ends of the spokes 19. The other flange 23, extends inwardly, at the inner side of the wheel.

The outer and larger bearing-ring or ball-race may be in the form of a solid ring; but I prefer to construct the same in two parts, 28 and 28′ one of which is shouldered over the other, as shown. These members are solidly held together by a metal retaining ring 28, formed with a pair of inturned flanges 28′ that fit into grooves formed in the bearing members to receive them. This ring 28 is made of steel, desirably, that is soft enough to permit its being flanged as shown upon the members 28 28′. The three rings 27 27′ 28, form a practically solid or unitary bearing-member, which is seated within the spoke-ring 18 and against flange 23 thereof. Said flange closely covers the annular crack between the ball-races, thus excluding dust and mud, but stops short of the flange 14 and does not materially overlap the inner race, 15.

The wheel-face member 20 has its periphery flattened, as shown, and detachably secured to the spoke-ring 18 with tap-bolts 30. In case the retainer ring 28 is narrower than its seat (as shown) the plate 20 will be formed with an annular flange 30′ upon its inner face, said flange bearing upon said ring 28. The member 20 is bulged outwardly in order to pass the screw-heads 17 and to increase the strength of the wheel. For imparting a finished appearance to the wheel, the said member is provided with a threaded annular flange 31 which receives a cap, as 32.

33 designates the bearing balls which are held between the races and permit the free rotation of the wheel proper, 19.

It is to be particularly noted that the wheel proper is rigidly connected, through its shaft 21, to the shaft drive at 22, which point is laterally distant from the plane of the wheel. It therefore follows that the lateral thrusts to which the wheel will be subjected when in use, will be largely sustained by this inner shaft member 6, which exerts, virtually, a leverage upon the wheel proper through the medium of said shaft. It will therefore be understood that such lateral stresses, which would tend to distort or injure said bearings, will be correspondingly reduced so far as their effects are concerned.

The construction herein described is duplicated at the opposite side of the vehicle, and the hollow axles 12 will be suitably braced. The manner in which the wheels are driven will be obvious from the foregoing description.

When it is desired to remove the wheel proper without disturbing the hub portion, the operator jacks up the axle 12, takes out the screws 30, and pulls off the wheel-face member 20 with shaft 21, which disengages from the rotor 6 as aforesaid. The ball bearing will then be exposed, and either of its members may be detached after first slipping the wheel-ring 18 inwardly therefrom and turning out one flange of the soft metal retaining ring 28. The hub portion of the wheel is obviously removable by taking out the tap-bolts 13.

One advantage attaching to this construction and not heretofore mentioned is that only one ball bearing is required, whereas the ordinary automobile wheel construction requires two.

The construction herein described may be varied without departing from the spirit and scope of the invention.

I claim as my invention:

1. In a vehicle a rear axle transmitting mechanism comprising an axle rotor; a frame member partly inclosing said rotor; a two-part rear wheel comprising the wheel proper consisting of the rim, the spokes, and a spoke-holding ring embracing the inner ends of the spokes; an outer bell-mouthed wheel-face member rigidly secured to the wheel proper and formed integral with a hollow drive-shaft which is provided with a slip-joint connection with said axle rotor; and the hub portion, of relatively large diameter and rigidly secured to said frame member through the medium of a reduced tubular, inwardly extending axle.

2. A vehicle drive-wheel comprising, in combination, a bell-mouthed outer face member having a hollow drive-shaft formed integral therewith, a spoke-holding ring carried by the peripheral portion of said face member, the spokes and rim, a ball-race mounted within said ring, a non-rotative hub member holding upon its periphery an inner ball-race, balls between said races, and a hollow axle the outer end of which is integral with or rigidly connected to said hub member.

3. A vehicle drive-wheel comprising, in combination, a bell-mouthed or flaring outer face member having a hollow drive-shaft formed integral therewith, a grooved spoke-holding ring detachably held by said face member; the spokes and rim; a detachable ball-race mounted within said ring, a non-rotative hub member holding upon its grooved periphery a detachable inner ball-race, balls between said races, and a tubular axle formed integral with or secured to the inner face of said hub member.

4. In a vehicle wheel, the combination with a diametrically enlarged hub member having a hollow reduced axle extension extending inwardly and secured to the frame of the vehicle, and a driving shaft extending through said axle and hub member, said driving shaft terminating in an enlarged annular extension to the periphery of which the vehicle wheel is rigidly secured.

5. In a vehicle, a rear axle transmission mechanism comprising an axle rotor, a rigid housing for said rotor, a vehicle wheel comprising the wheel proper, a relatively large non-rotative hub member, an anti-friction bearing between said wheel members, a tubular member of small diameter relative to said hub member, and connecting the latter to said housing, an outer wheel-face member secured to the wheel proper, and a driving shaft formed integrally with said wheel-face member and having a slip joint connection with said rotor.

MARTIN L. WILLIAMS.

Witnesses:
ROBERT P. KIZER,
FRANK L. BELKNAP.